US012433846B2

(12) United States Patent
Morch et al.

(10) Patent No.: US 12,433,846 B2
(45) Date of Patent: *Oct. 7, 2025

(54) DRUG DELIVERY SYSTEM FOR TREATMENT OF CANCER

(71) Applicants: SINTEF TTO AS, Trondheim (NO); Oslo Universitetssykehus HF, Oslo (NO)

(72) Inventors: Yrr Morch, Trondheim (NO); Ruth Schmid, Tiller (NO); Einar Sulheim, Trondheim (NO); Per Stenstad, Trondheim (NO); Heidi Johnsen, Trondheim (NO); Kjersti Flatmark, Blommenholm (NO); Karianne Giller Fleten, Oslo (NO)

(73) Assignees: SINTEF TTO AS, Trondheim (NO); Oslo Universitetssykehus HF, Oslo (NO)

( * ) Notice: Subject to any disclaimer, the term of this patent is extended or adjusted under 35 U.S.C. 154(b) by 147 days.

This patent is subject to a terminal disclaimer.

(21) Appl. No.: 17/484,725

(22) Filed: Sep. 24, 2021

(65) Prior Publication Data

US 2022/0257525 A1      Aug. 18, 2022

Related U.S. Application Data

(63) Continuation of application No. PCT/EP2019/076121, filed on Sep. 26, 2019, and a continuation-in-part of application No. 16/366,596, filed on Mar. 27, 2019, now Pat. No. 11,806,330.

(51) Int. Cl.
    *A61K 9/51*      (2006.01)
    *A61K 31/337*   (2006.01)
    *B82Y 5/00*      (2011.01)

(52) U.S. Cl.
    CPC .......... *A61K 9/5153* (2013.01); *A61K 9/5192* (2013.01); *A61K 31/337* (2013.01); *B82Y 5/00* (2013.01)

(58) Field of Classification Search
    None
    See application file for complete search history.

(56) References Cited

U.S. PATENT DOCUMENTS

| | | | | |
|---|---|---|---|---|
| 2008/0182776 | A1* | 7/2008 | Lee | A61K 9/1075 514/629 |
| 2010/0015165 | A1 | 1/2010 | Landfester et al. | |
| 2010/0209354 | A1 | 8/2010 | Horcajada-Cortes et al. | |
| 2016/0129132 | A1* | 5/2016 | Schmid | C08F 283/06 526/199 |
| 2018/0185321 | A1* | 7/2018 | Taub | A61K 31/704 |
| 2019/0117582 | A1* | 4/2019 | Zhang | A61K 31/337 |
| 2019/0216839 | A1* | 7/2019 | Miyano | C12N 15/113 |
| 2019/0298682 | A1 | 10/2019 | Morch et al. | |
| 2020/0023073 | A1 | 1/2020 | Morch et al. | |
| 2020/0061019 | A1 | 2/2020 | Morch et al. | |
| 2021/0113482 | A1 | 4/2021 | Morch et al. | |

FOREIGN PATENT DOCUMENTS

| | | |
|---|---|---|
| CN | 107115532 A | 9/2017 |
| EP | 2508207 A1 | 10/2012 |
| EP | 2913065 A1 | 9/2015 |
| NO | 342271 B1 | 4/2018 |
| WO | 2006016020 A2 | 2/2006 |
| WO | 2006127953 A2 | 11/2006 |
| WO | 2008003706 A1 | 1/2008 |
| WO | 2014191502 A1 | 12/2014 |
| WO | 2016083533 A1 | 6/2016 |
| WO | 2016134115 A1 | 8/2016 |
| WO | 2017143967 A1 | 8/2017 |
| WO | 2017204475 A1 | 11/2017 |
| WO | 2018060437 A1 | 4/2018 |

OTHER PUBLICATIONS

Bensaid et al.; "Y-Shaped mPEG-PLA Cabazitaxel Conjugates: Well-Controlled Synthesis by Organocatalytic Approach and Self-Assembly into Interface Drug-Loaded Core-Corona Nanoparticles"; Biomacromolecules, vol. 14; 2013; pp. 1189-1198.
Burns, B.; "Polycyanoacrylates"; Encyclopedia of Polymer Science and Technology; John Wiley & Sons, Inc.; 2016; DOI: 10.1002/0471440264.pst256.pub2.
Crespy, D. et al.; "Miniemulsion polymerization as a versatile tool for the synthesis of functionalized polymers"; Beilstein Journal of Organic Chemistry, vol. 6; 2010; pp. 1132-1148; doi: 10.3762/bjoc.6.130.
Daisuke et al.; "Intraperitoneal chemotherapy for gastric cancer with peritoneal metastasis"; Gastric Cancer, vol. 20, Issue No. 1; 2016; pp. 111-121.
Flatmark et al., "Exploring the peritoneal surface malignancy phenotype—a pilot immunohistochemical study of human pseudomyxoma peritonei and derived animal models," Human Pathology, 2010, vol. 41(8), pp. 1109-1119.
Flatmark et al., "Immunotoxin targeting EpCAM effectively inhibits peritoneal tumor growth in experimental models of mucinous peritoneal surface malignancies," International Journal of Cancer, 2013, vol. 133(6) pp. 1497-1506.
Flatmark et al., "Pseudomyxoma peritonei-two novel orthotopic mouse models portray the PMCA-I histopathologic subtype," BMC Cancer, 2007, vol. 7:116, pp. 1-7.
Fusser et al.; "Cabazitaxel-loaded Poly(2-ethylbutyl cyanoacrylate) nanoparticles improve treatment efficacy in a patient derived breast cancer xenograft"; Journal of Controlled Release, vol. 293; 2018; pp. 190-192.
Hallaj-Nezhadi et al.; "Intraperitoneal delivery of nanoparticles for cancer gene therapy"; Future Oncology, vol. 9, Issue No. 1; 2013; pp. 59-68.
International Preliminary Report on Patentability; International Application No. PCT/EP2017/074798; International Filing Date Sep. 29, 2017; Date of Mailing Aug. 21, 2018; 17 pages.
International Search Report and Written Opinion for International Application No. PCT/EP2019/057678; International Filing Date Mar. 27, 2019; Date of Mailing, Jun. 25, 2019; 14 pages.

(Continued)

*Primary Examiner* — Danah Al-Awadi
(74) *Attorney, Agent, or Firm* — Karen A. LeCuyer; DeWitt LLP

(57) ABSTRACT

Described herein is a hydrophobic anti-cancer drug encapsulated into poly(alkyl cyanoacrylate) nanoparticles and their use in cancer treatments by intracavitary rout of administration such as intraperitoneal administration.

11 Claims, 7 Drawing Sheets

(56) References Cited

OTHER PUBLICATIONS

International Search Report and Written Opinion for International Application PCT/EP2019/076121; International Filing Date Sep. 26, 2019; date of Mailing Jan. 2, 2020; 12 pages.

International Search Report and Written Opinion, International Application No. PCT/EP2017/074798; International Filing Date Sep. 29, 2017, Date of Mailing Jan. 12, 2017; 9 pages.

Kamei et al.; "Spatial distribution of intraperitoneally administrated paclitaxel nanoparticles solubilized with poly (2-methacryloxyethyl phosphorylcholine-co n-butyl methacrylate) in peritoneal metastatic modules"; Cancer Science, vol. 102, Issue No. 1; 2010; pp. 200-205.

Kumari et al., "Biodegradable polymeric nanoparticles based drug delivery systems," Colloids and Surfaces B: Biointerfaces, 2010, vol. 75, pp. 1-18.

Lu et al.; "Paclitaxel nanoparticle inhibits growth of ovarian cancer xenografts and enhances lymphatic targeting"; Cancer Chemotherapy and Pharmacology, vol. 59, Issue No. 2; 2006; pp. 175-181.

Matsumura et al., "A new concept for macromolecular therapeutics in cancer chemotherapy: mechanism of tumoritropic accumulation of proteins and the antitumor agent smancs," Cancer Research, 1986, vol. 46 (12 Pt 1), pp. 6387-6392.

Peracchia et al., "Development of sterically stabilized poly(isobutyl 2-cyanoacrylate) nanoparticles by chemical coupling of poly(ethylene glycol)," Journal of Biomedical Materials Research, 1997, vol. 34, pp. 317-326.

Petrillo et al.; "Cytoreductive Surgery Plus Platinum-Based Hyperthermic Intraperitoneal Chemotherapy in Epithelial Ovarian Cancer: A Promising Integrated Approach to Improve Locoregional Control"; Oncologist, vol. 21, Issue No. 5; 2016; pp. 532-534.

Prabhakar et al., "Challenges and key considerations of the enhanced permeability and retention effect for nanomedicine drug delivery in oncology," Cancer Research, 2013, vol. 73 (8), pp. 2412-2417.

Shi et al., "Cancer nanomedicine: progress, challenges and opportunities," Nat Rev Cancer, 2017, vol. 17 (1), pp. 20-37.

Snipstad et al., "Ultrasound Improves the Delivery and Therapeutic Effect of Nanoparticle-Stabilized Microbubbles in Breast Cancer Xenografts," Ultrasound Med Biol., 2017, vol. 43 (11), 2651-2669.

Sulheim et al., "Cellular uptake and intracellular degradation of poly(alkyl cyanoacrylate) nanoparticles," Journal of Nanobiotechnology, 2016, vol. 14 (1), pp. 1-14.

Sulheim et al., "Cytotoxicity of Poly(Alkyl Cyanoacrylate) Nanoparticles," International Journal of Molecular Sciences, 2017, vol. 18., 2454, pp. 1-17.

Torchilin et al., "Multifunctional, stimuli-sensitive nanoparticulate systems for drug delivery," Nat. Rev. Drug Discov, 2014, vol. 13 (11), pp. 813-827.

Tsao et al.; "The Rose of Cabazitaxel in the Treatment of Metastatic Castration-Resistant Prostate Cancer"; The Adv Urol; 6(3); pp. 97-104; (2014).

Vrignaud et al., "Preclinical antitumor activity of cabazitaxel, a semisynthetic taxane active in taxane-resistant tumors," Clinical Cancer Research, 2013, vol. 19 (11), pp. 2973-2983.

Zhang et al., "Preparation, characterization and biocompatibility of poly(ethylene glycol)-poly(n-butyl cyanoacrylate) nanocapsules with oil core via miniemulsion polymerization," European Polymer Journal, 2008, vol. 44, Issue 6, pp. 1654-1661.

Dieras, V. et al.; "Cabazitaxel in patients with advanced solid tumours: Results of a Phase I and pharmacokinetic study"; European Journal of Cancer, vol. 49; 2013; pp. 25-34; DOI: http://dx.doi.org/10.1016/j.ejca.2012.07.008.

Hekmatara, T. et al.; "Encapsulation of Water-Insoluble Drugs in Poly(butyl cyanoacrylate) Nanoparticles"; Journal of Nanoscience and Nanotechnology, vol. 9; 2009; pp. 5091-5098; DOI: 10.1166/jnn.2009.GR05.

Hu, X.; "Docetaxel-Loaded Cholesterol-PEG Co-Modified Poly (n-Butyl) Cyanoacrylate Nanoparticles for Antitumor Drug Pulmonary Delivery: Preparation, Characterization, and in vivo Evaluation"; International Journal of Nanomedicine, vol. 15; 2020; pp. 5361-5376.

Huang, C.; "Synthesis of high loading and encapsulation efficient paclitaxel-loaded poly(n-butyl cyanoacrylate) nanoparticles via miniemulsion"; International Journal of Pharmaceutics, vol. 338; 2007; pp. 267-275.

Dakwar, G. et al.; "Nanomedicine-based intraperitoneal therapy for the treatment of preitoneal carcinomatosis—Mission possible?" Advanced Drug Delivery Reviews, vol. 108; 2017; pp. 13-24.

Vrignaud, P. et al.; "Preclinical Antitumor Activity of Cabazitaxel, a Semisynthetic Taxane Active in Taxane-Resistant Tumors"; Clinical Cancer Research, vol. 19, Issue No. 11; 2013; pp. 2973-2983.

Yordanov, G.; "Poly(alkyl cyanoacrylate) nanoparticles as drug carriers: 33 years later"; Bulgarian Journal of Chemistry, vol. 1, Issue No. 2; 2012; pp. 61-73.

Zhao, Li, et al. Nanoparticles and photodynamic therapy applied to ovarian cancer, Prog. Obstet Gynecol. 24(1), 2015, 11-13, English abstract.

* cited by examiner

PERITONEUM

DRUG DELIVERY SYSTEM FOR TREATMENT OF CANCER

CROSS-REFERENCE TO RELATED APPLICATIONS

This application is a bypass continuation of PCT/EP2019/076121 filed on Sep. 26, 2019, which claims priority to U.S. patent application Ser. No. 16/366,596 filed on Mar. 27, 2019, and is also a continuation-in-part of U.S. patent application Ser. No. 16/366,596 filed on Mar. 27, 2019, which claims priority to NO20180429 filed on Mar. 27, 2018.

FIELD OF DISCLOSURE

The disclosure is related to the field of nanoparticles and medical treatment. In particular, it relates to a hydrophobic active ingredient encapsulated into poly(alkyl cyanoacrylate) nanoparticles and their use in cancer treatments by an intracavitary rout of administration such as intraperitoneal administration.

BACKGROUND

The use of nanotechnology in medicine offers many exciting possibilities with potential in a number of medicinal applications envisaged. In particular, nanomedicine is expected to lead to big improvements in the treatment of complex diseases. Two areas in which the use of nanoparticles has begun to demonstrate particular value are drug delivery and molecular imaging.

Poly(alkyl cyanoacrylate) (PACA) was first developed and approved as a surgical glue. PACA nanoparticles (NPs) have later demonstrated promising abilities as a drug carrier, being biodegradable and allowing high drug loading capacity.

WO02014191502 A1 discloses a one-step polymerization process for preparing stealth NPs of PACA homopolymer or copolymer comprising anionic polymerization of an oil-in-water miniemulsion. As disclosed, by utilizing a miniemulsion in combination with a particular class of polyalkylene glycol derivatives the process is particular suitable for encapsulating hydrophobic drugs to ensure high loading capacity.

It is possible to covalently attach targeting moieties to polyalkylene glycols, thereby enabling the simultaneous introduction of a targeting group and formation of a stealth corona. It is described that the miniemulsion may contain active agents, and a list of therapeutic agents are disclosed. However, none of the examples include encapsulation of any of these agents, and neither in vitro nor in vivo data is disclosed.

Although new, targeted treatment options and immunotherapy are being developed, chemotherapy is still the main therapeutic option for patients with advanced cancer. However, the therapeutic effect is not sufficient for certain cancer types and the treatment also results in severe side effects. Several products of drug-loaded NPs have reached the market, and many new product candidates are in clinical trials. These aspects, including the challenges and opportunities of using nanoparticles in cancer drug delivery, have been discussed in multiple reviews and commentaries including Shi et al. (Shi, J.; Kantoff, P. W.; Wooster, R.; Farokhzad, O. C., Cancer nanomedicine: progress, challenges and opportunities. *Nat Rev Cancer* 2017, 17 (1), 20-37) and Torchilin (Torchilin, V. P., Multifunctional, stimuli-sensitive nanoparticulate systems for drug delivery. *Nat. Rev. Drug Discov* 2014, 13 (11), 813-827).

In addition to improving efficacy by benefiting from the enhanced permeability and retention (EPR) effect (Matsumura, Y.; Maeda, H., A new concept for macromolecular therapeutics in cancer chemotherapy: mechanism of tumoritropic accumulation of proteins and the antitumor agent smancs. *Cancer Res* 1986, 46 (12 Pt 1), 6387-6392), NP encapsulated drug delivery may demonstrate reduced toxicity. The main advantage of the drug-loaded NPs in the market is that they give less adverse effects than free drug, while the therapeutic efficacy is rather similar, as described in Parahbakar et al. (Prabhakar, U.; Maeda, H.; Jain, R. K.; Sevick-Muraca, E. M.; Zamboni, W.; Farokhzad, O. C.; Barry, S. T.; Gabizon, A.; Grodzinski, P.; Blakey, D. C., Challenges and key considerations of the enhanced permeability and retention effect for nanomedicine drug delivery in oncology. *Cancer Res* 2013, 73 (8), 2412-7).

In Snipstad et al. (Snipstad, S.; Berg, S.; Morch, Y.; Bjorkoy, A.; Sulheim, E.; Hansen, R.; Grimstad, I.; van Wamel, A.; Maaland, A. F.; Torp, S. H.; Davies, C. L., Ultrasound Improves the Delivery and Therapeutic Effect of Nanoparticle-Stabilized Microbubbles in Breast Cancer Xenografts. *Ultrasound Med Biol* 2017, 43 (11), 2651-2669), the medical use of PEGylated PEBCA NPs in combination with microbubbles (MBs) and ultrasound is described. The drug delivery system as described consists of microbubbles stabilized by polymeric nanoparticles (NPMBs), which enables ultrasound-mediated drug delivery. The NPs are synthesized by miniemulsion polymerization. It is disclosed NPs containing cabazitaxel (CBZ), and in vitro toxicity of these NPs in triple-negative human breast adenocarcinoma cells, MDA-MB-231. The in vivo data of the drug delivery system disclosed in Snipstad et al. described the therapeutic effect achieved by NP-stabilized MBs on localized, solid tumors, and how an improved effect is achieved by applying focused ultrasound.

Taxanes are important chemotherapeutic agents with proven efficacy in many human cancers. Taxanes include paclitaxel, docetaxel, cabazitaxel (CBZ) and their pharmaceutically acceptable salts. Paclitaxel was originally derived from the Pacific yew tree. Docetaxel is a semi-synthetic analogue of paclitaxel. CBZ, which has been characterized by Vrignaud et al. (Vrignaud, P.; Semiond, D.; Lejeune, P.; Bouchard, H.; Calvet, L.; Combeau, C.; Riou, J. F.; Commercon, A.; Lavelle, F.; Bissery, M. C., Preclinical antitumor activity of cabazitaxel, a semisynthetic taxane active in taxane-resistant tumors. *Clin Cancer Res* 2013, 19 (11), 2973-83), is a relatively novel semi-synthetic taxane derivative. CBZ has a potent cytostatic effect by microtubule stabilization, but its use has been limited due to its toxicity. CBZ has been included in several clinical trials investigating efficacy against several types of cancer. It has been approved by the US Food and Drug Administration (FDA) for treatment of refractory prostate cancer as a second line drug after docetaxel chemotherapy. Taxanes present difficulties in formulation as medicines because they are hydrophobic and poorly soluble in water.

Many primary cancers such as ovarian cancer or cancers of the liver, colon and pancreas might migrate to the peritoneal cavity. The attachment of cancer cells to the mesothelial layer of the peritoneal membrane results in the formation of peritoneal carcinomatosis (PC). The benefit of direct peritoneal administration is to achieve high local drug concentration and at the same time limiting systemic toxicity compared to intravenous administration (IV) of chemotherapeutics. Earlier attempts have been made to deliver chemotherapeutics into tumor sites in the peritoneal cavity using nanoparticles and through IP or IV, for example Dakwar et al., (Dakwar G. R., Shariati M., Willaert W., Ceelen W., De Smedt S. C., Remaut K., Nanomedicines-based intraperitoneal therapy for the treatment of peritoneal carcinomatosis—mission possible? *Advanced Drug Delivery Reviews* 2017 108: 13-24 and Reddy, H. L. and Murthy, R. S. R., Pharmacokinetics and biodistribution studies of doxorubicin loaded poly(butyl cyanoacrylate) nanoparticles synthesized by two different techniques., *Biomed Pap Med Fac Univ Palacky Olomouc Czech Repub.* 2004 December;148(2): 161-6. However, there is still a need for further development of nanoparticles suitable for IP delivery of chemotherapeutics as nanoparticles and IP treatment of primary cancers of the peritoneum or peritoneal carcinomatosis is still not standard care.

It is therefore desirable, and hence an object of the present disclosure, to develop a drug delivery system comprising nanoparticles which is capable of effectively delivering a therapeutic agent to a specific location. In particular, a drug delivery system which demonstrates efficacy and prolong residence in a human or animal body cavity in addition to fewer adverse side effects would be desirable.

It is further desired that the drug delivery system is capable of delivering hydrophobic anti-cancer therapeutic agents to the peritoneal cavity through IP for treatment of primary peritoneal cancer or peritoneal carcinomatosis. A person skilled in the art would also understand that the nanoparticles provided herein can be administered to other human or animal body cavities than the peritoneum for treatment of cancer in that cavity.

SUMMARY

In a first aspect, provided herein is a method for treatment of cancer in a subject, the method comprising intracavitary administering to the subject a poly(alkyl cyanoacrylate) nanoparticle, the nanoparticle comprising a hydrophobic anti-cancer drug, and wherein the nanoparticle is administered to the subject in an amount sufficient to treat the cancer in the subject. In another aspect provided herein is a method wherein the intracavitary administration is an intraperitoneal administration.

In another aspect provided herein is a method wherein the method does not comprise, NP-stabilized microbubbles (MBs). In another aspect, the method does not comprise NPs that stabilize the MBs or NPs that are used to stabilize gas-filled MBs. In another aspect, the method does not comprise NPs that are associated with the MBs. In yet another aspect, the method does not comprise gas-filled MBs. In a further aspect, the method does not comprise MBs.

In another aspect provided herein, is a method, wherein the nanoparticle is administered in an amount sufficient to inhibit the metastasis of the cancer in the subject and the method comprises inhibiting metastasis in the subject.

In a further aspect, the PACA NPs are produced according to a miniemulsion anionic polymerization process.

In a further aspect provided herein is a method wherein the hydrophobic anti-cancer drug is encapsulated by the PACA NP, i.e. the hydrophobic anti-cancer drug is loaded within the nanoparticle.

In a further aspect provided herein is a method wherein, the PACA NP has dimensions below 800 nm, such as in a range selected from 1-800 nm or 30-500 nm or 80-200 nm. In a further aspect provided herein is a method wherein, the PACA NP has average dimensions from 80 to 200 nm.

In yet another aspect provided herein, is a method wherein the PACA NPs are PEGylated.

In yet another aspect provided herein is a method wherein¨, the alkyl chain of the cyanoacrylate is selected from the group consisting of n-butyl-(BCA), 2-ethyl butyl (EBCA), polyisohexyl (IHCA) and octyl cyanoacrylate (OCA).

In yet another aspect provided herein is a method wherein, the NPs are further surface modified by a targeting moiety.

In yet another aspect provided herein is a method wherein hydrophobic anti-cancer drug comprises 1-90 wt % of the total weight of the NP, In yet another aspect provided herein is a method wherein hydrophobic anti-cancer drug comprises preferentially 5-50 wt % of the total weight of the NP, more preferentially 5-20 wt % total weight of the NP or most preferentially 5-15 wt % of the total weight of the NP.

In yet another aspect provided herein is a method wherein the hydrophobic anti-cancer drug comprises from 6-13 wt % of the total weight of the NP, more particularly about 6, 7, 8, 9, 10, 11, 12 or 13 wt % of the total weight of the NP.

In yet another aspect provided herein is a method wherein the method further comprises pharmaceutically acceptable excipients.

In yet another aspect provided herein is a method wherein the hydrophobic anti-cancer drug is a taxane.

In yet another aspect provided herein is a method wherein the taxane comprises 1-90 wt % of the total weight of the NP, In yet another aspect provided herein is a method wherein the taxane comprises preferentially 5-50 wt % of the total weight of the NP, more preferentially 5-20 wt % total weight of the NP or most preferentially 5-15 wt % of the total weight of the NP.

In yet another aspect provided herein is a method wherein the taxane comprises from 6-13 wt % of the total weight of the NP, more particularly about 6, 7, 8, 9, 10, 11, 12 or 13 wt % of the total weight of the NP.

In yet another aspect provided herein is a method wherein the taxane is cabazitaxel.

In yet another aspect provided herein is a method wherein the cabazitaxel comprises 1-90 wt % of the total weight of the NP, In yet another aspect provided herein is a method wherein the cabazitaxel comprises preferentially 5-50 wt % of the total weight of the NP, more preferentially 5-20 wt % total weight of the NP or most preferentially 5-15 wt % of the total weight of the NP.

In yet another aspect provided herein is a method wherein the cabazitaxel comprises from 6-13 wt % of the total weight of the NP, more particularly about 6, 7, 8, 9, 10, 11, 12 or 13 wt % of the total weight of the NP.

In yet another aspect provided herein is a method wherein the cancer is selected from the group consisting of prostate cancer, breast cancer, peritoneal cancer, colorectal carcinoma, gastric cancer, rectal carcinoma glioma, lung cancer, renal cancer, liver cancer, spleen cancer, gallbladder carcinoma, lymphoma, adrenocortical carcinoma, testicular cancer, urothelium transitional cell carcinoma, and ovarian cancer.

In yet another aspect provided herein is a method wherein the cancer is primary peritoneal cancer or peritoneal carcinomatosis originating from ovarian cancer, colorectal carcinoma, gastric cancer, renal cancer, rectal carcinoma, pseudomyxoma peritonei, pancreatic carcinoma, hepatocellular carcinoma, gallbladder carcinoma, appendiceal malignancies, endometrial carcinoma, cervical cancers, breast cancer, lung cancer, malignant melanoma, adrenocortical carcinoma or transitional cell carcinoma of the urinary tract.

BRIEF DESCRIPTION OF THE FIGURES

In FIG. 7A, Whole body images were obtained 1 h, 24 h, 72 h, 7 days and 14 days after intraperitoneal or intravenous administration of the NPs. In FIG. 7B, ex vivo fluorescence images of isolated organs were obtained at the timepoints in (A). Images of isolated organs 7 days after the injection is shown. FIG. 7C shows quantification of fluorescence intensity as relative radiant efficiency per region of interest pixel data of tissues collected were calculated at the 7 day timepoint. FIG. 7D shows quantification of fluorescence intensity as relative radiant efficiency per region of interest pixel data of tissues collected were calculated at the 14 day timepoint. Quantification of fluorescence intensity as relative radiant efficiency per region of interest pixel data of tissues collected 7 days and 14 days is shown. FIG. 7D shows euantification of fluorescence intensity as relative radiant efficiency per region of interest pixel data of peritoneum tissue collected 1 h, 24 h, 72 h, 7 days and 14 days is shown.

DETAILED DESCRIPTION

Definitions

Figure 1:
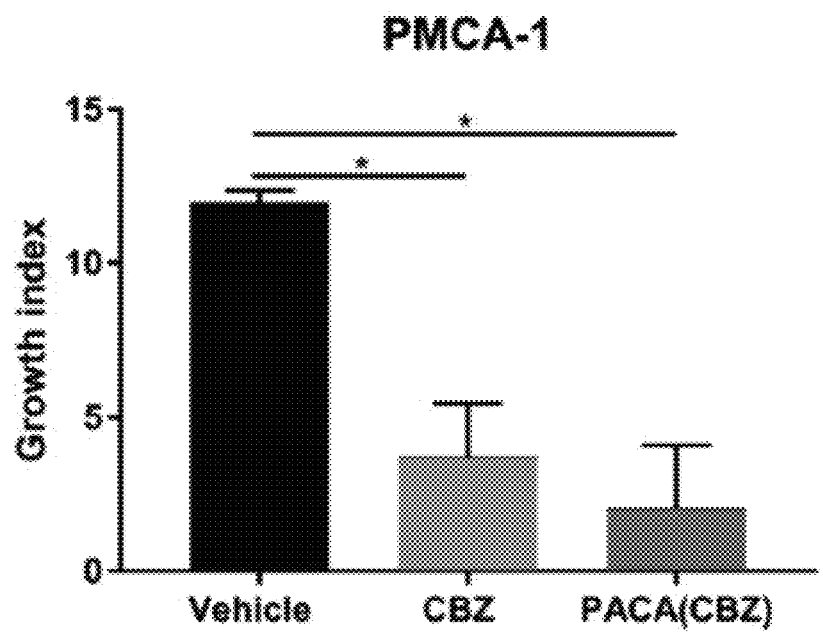
FIG. 1: Displaying tumor growth index in response to treatment with 15 mg/kg CBZ and PACA(CBZ) in PMCA-1. The nanoparticles were injected intraperitoneally. * indicates p<0.05. CBZ: 3 out of 6 mice were cured by the treatment. PACA(CBZ): 5 out of 6 mice were cured. PBS (Phosphate Buffer Saline) The term "cured" refers to the animals that were sacrificed on day 100 with no detectable tumor.

The term 'nanoparticle, (NP)' is used herein to describe particles or capsules with linear dimensions less than 800 nm.

The terms "particle size" or "linear dimension" or "dimensions" are used herein to describe the size characterization of nanoparticles which can be measured using different methods as described for example in F. Caputo, J Clogston, L. Calzolai, M. Roesslein, A. Prina-Mello, Measuring particle size distribution of nanoparticle enabled medicinal products, the joint view of EUNCL and NCI-NCL. A step by step approach combining orthogonal measurements with increasing complexity Journal of Controlled release, Volume 299, p 31-43 2019. Because the particles being studied are not the exact same size, the terms "size distribution" or "average linear dimensions" or "average particle size" is used.

The term "PEGylation" is used herein to describe the process of both covalent and non-covalent attachment or amalgamation of polyethylene glycol (PEG) polymer chains to nanoparticles, which is then described as PEGylated (pegylated). As will be known to the skilled person, the association of PEG to the NP surface can "mask" the NP from the host's immune system by creating a water corona around the NP. This can reduce the immunogenicity and antigenicity of the NP, and prolong its circulatory time by reducing renal clearance. Depending on the density of PEG on the surface, the PEG is classified as being in a brush or mushroom conformation. The PEGylation can be performed either during or after synthesis of the NPs, by either a covalent or noncovalent bond, resulting in varying properties of the PEGylation.

The term "targeting moiety" is used herein to describe any molecule that can be bound to the surface of the NP and result in selective binding to specific cells or biological surfaces.

The term "passive targeting" is used herein to describe the accumulation and/or retention of nanoparticles in inflamed and malignant tissue that occurs due to leaky blood vessels and impaired lymphatic drainage. Passive targeting is independent of targeting moieties on the surface of NPs.

The term "enhanced permeability and retention (EPR)" effect is an example of passive targeting and describe the phenomenon where molecules of certain sizes (typically liposomes, nanoparticles, and macromolecular drugs) tend to accumulate in tumor tissue much more than they do in normal tissues upon administration intravenously.

The NPs as described herein are typically of a size from about 1-800 nm, such as about 30-500, preferably about 80-2000 nm. Accordingly, the EPR effect will allow the NPs as described herein to selectively extravasate and accumulate in tumors.

The term "active targeting" is used herein to describe the accumulation and/or retention of the nanoparticle on specific cells or biological surfaces due to the specific interaction between the targeting moiety and the cell surface or the biological surface.

The terms "intraperitoneal administration" and "administered intraperitoneally" are recognized terms in the art and include modes of administration via a non-limiting list comprising injections and use of a catheter to a human or animal peritoneum. One type of therapy which is administrated intraperitoneally is intraperitoneal chemotherapy, such as hyperthermic intraperitoneal chemotherapy (HIPEC), where chemotherapy is administrated directly into the peritoneal cavity.

The term "peritoneum" is a recognized term in the art. The peritoneum is also recognized as abdominopelvic cavity. A non-limiting list of abdominopelvic cavities is the abdominal cavity (e.g. digestive organs, spleen, kidneys) and pelvic cavity (e.g. bladder, reproductive organs).

The terms "intracavitary administration" and "administered intracavitary" are recognized terms in the art and include mode of administration via a non-limiting list comprising injections and use of a catheter to a human or animal body cavity or space. One type of therapy which is administrated intracavitary is intracavitary chemotherapy, such that chemotherapy is administrated directly into a human or animal body cavity.

The term "body cavity" is a recognized terms in the art. A non-limiting list of human or animal body cavities is cranial cavity (e.g. brain), vertebral cavity (e.g. spinal cord), thoracic cavity (e.g. heart, lung), abdominal cavity (e.g. digestive organs, spleen, kidneys) and pelvic cavity (e.g. bladder, reproductive organs).

The term "hydrophobic" as used herein refers to a pharmaceutically active drugs that have poor solubility in aqueous solutions. How to measure hydrophobicity and solubility is known to a person skilled in the art and can for example be found in the Pharmacopoeia, for example in section 5.11. "Characters section in monographs" of the European Pharmacoeia, page 729, 01/2008:51100. Example of hydrophobic drugs of the present invention are taxanes.

The term "pharmaceutically acceptable" as used herein denotes that the system or composition is suitable for administration to a subject, including a human patient, to achieve the treatments described herein, without unduly deleterious side effects in light of the severity of the disease and necessity of the treatment.

The terms "therapy", "treat," "treating," and "treatment" are used synonymously to refer to any action providing a benefit to a patient at risk for or afflicted with a disease, including improvement in the condition through lessening, inhibition, suppression or elimination of at least one symptom, delay in progression of the disease, prevention, delay in or inhibition of the likelihood of the onset of the disease, etc.

The terms "microbubble associated with nanoparticles" or "nanoparticles associated with microbubbles" are used herein to describe in what way nanoparticles can interact with the microbubble interface. The term "associated with" as used in connection with this include association by any type of chemical bonding, such as covalent bonding, non-covalent bonding, hydrogen bonding, ionic bonding or any other surface-surface interactions.

Description

Described herein is a drug delivery system comprising poly(alkyl cyanoacrylate) (PACA) nanoparticles (NPs) comprising a hydrophobic anti-cancer drug such as cabazitaxel (CBZ) for treatment of cancer.

In a preferred embodiment, the drug delivery system is for intraperitoneal administration.

One embodiment of the invention is a drug delivery system that does not comprise microbubbles (MBs).

The effect of PACA NPs loaded with the cytotoxic drug CBZ is demonstrated in vivo, in two animal models generated by implanting tumor tissue pieces from patients with peritoneal metastases from colorectal cancer or pseudomyxoma peritonei in nude mice.

The peritoneum is a mesothelial lining covering the abdominal cavity (parietal peritoneum) and intraperitoneal organs (visceral peritoneum). This peritoneal lining of the cavity supports many of the abdominal organs and serves as a conduit for their blood vessels, lymphatic vessels, and nerves. The peritoneal cavity contains a small amount of fluid, which circulates under the influence of negative pressure generated by the diaphragm, gravity and bowel peristalsis. This natural flow pattern determines the route of spread of disease processes within the peritoneal cavity. The structures within the intraperitoneal space are called "intraperitoneal" and include the stomach and intestines.

Intraperitoneal injection or IP injection is the injection of a substance into the peritoneum (body cavity). In the past it has more often been applied to animals than to humans. In general, it is preferred when large amounts of blood replacement fluids are needed or when low blood pressure or other problems prevent the use of a suitable blood vessel for intravenous injection.

In animals, it is used predominantly in veterinary medicine and animal testing for the administration of systemic drugs and fluids because of the ease of administration compared with other parenteral methods.

In humans, the method may be used to administer chemotherapy drugs to treat some cancers, for example such as ovarian cancer. Administering chemotherapy directly into the peritoneal cavity permits a several-fold increase in drug concentration to be achieved within the abdominal cavity.

According to the invention, intraperitoneal (IP) chemotherapy may be used alone, before or subsequent to cytoreductive surgery.

Cytoreductive surgery is a surgical procedure used to remove tumors affecting the protective lining of the abdomen. When it's paired with hyperthermic intraperitoneal chemotherapy, it considerably increases life expectancy and reduces the rate of cancer recurrence. Hyperthermic intraperitoneal chemotherapy (HIPEC) is a highly concentrated, heated chemotherapy treatment delivered directly to the abdomen during surgery.

While cytoreductive surgery and intraperitoneal (IP) chemotherapy may constitute a curative option for some patients, treatment outcome is still highly variable and the search for novel therapies is warranted.

Peritoneal carcinomatosis (PC) is defined as intraperitoneal dissemination of any tumor which is not originated from the peritoneum itself.

PC is most commonly seen in abdominopelvic malignancies. Ovarian cancer is the most common cause (46%) followed by colorectal carcinoma (31%), pancreatic cancer, stomach cancer and other malignancies including the hepatocellular carcinoma, gallbladder carcinoma, renal cell carcinoma, transitional cell carcinoma, endometrial, cervical cancers and unknown primary. Extra-abdominal conditions such as breast cancer, lung cancer and malignant melanoma can involve the peritoneal cavity through the haematogenous spread.

Five human tumors and corresponding orthotopic animal models from human PC derived from colorectal carcinoma or pseudomyxoma peritonei have been extensively characterized by immunohistochemical analysis by the inventors (Flatmark, K., et al., Exploring the peritoneal surface malignancy phenotype—a pilot immunohistochemical study of human pseudomyxoma peritonei and derived animal models. Human Pathology, 2010. 41(8): p. 1109-1119).

As disclosed herein, studies demonstrate effects of NP-encapsulated hydrophobic anti-cancer drug, CBZ, in two of these models, namely the ones denoted PMCA1 and PMCA3. It is demonstrated that NP-encapsulated CBZ has similar or even better efficacy than similar concentrations of non-encapsulated drug.

Few drugs are active in the treatment of peritoneal metastases from colorectal cancer and pseudomyxoma peritonei. In principle, several of the drugs used in standard-of-care treatment of metastatic colorectal cancer are relevant in this setting, however, none of these drugs are considered very efficacious in the treatment of peritoneal disease. For patients with pseudomyxoma peritonei in particular, no systemic chemotherapy is considered efficacious. Accordingly, this particular group of patients has a high unmet need for treatment. In summary, encapsulation of CBZ or an alternative hydrophobic anti-cancer drug in PACA NPs is a promising alternative to the clinically available formulation of these hydrophobic drugs.

Studies has been conducted to demonstrate effects of PACA NPs loaded with the cytotoxic drug CBZ in in vivo models with peritoneal carcinomatosis (PC) by intraperitoneal administration. Primary cancer occurring in the abdominal organs (e.g. ovary, colon and rectum, stomach and pancreas) often leads to the migration of cancer cells to the peritoneal cavity resulting in the formation of peritoneal carcinomatosis. As an alternative route of administration, intraperitoneal (IP) chemotherapy were tested in two different mouse models, both demonstrating an improved efficacy of PACA NPs loaded with CBZ compared to IP therapy with CBZ alone, see FIGS. 1-6 and example 2. The intraperitoneal administration was performed with intraperitoneal injections.

Without being bound by theory, it is hypothesized that the improved results achieved with IP therapy is due to the high local drug concentration achieved with PACA NPs loaded with a hydrophobic anti-cancer drug such as the cytotoxic drug CBZ in the peritoneum. By encapsulating the drug, an enhanced retention of the drug is achieved compared to administration of free drug. In addition, there may be an interaction between tumors in the peritoneum and the PACA NPs, further enabling a high concentration of drugs reaching the tumors. An additional benefit of the intraperitoneal administration is that systemic toxicity is reduced compared to parental injections into the blood, in particular when the drug is encapsulated, see distributions studies FIG. 7A-E, which clearly demonstrate that PACA NP's administrated intraperitoneally show an increase concentration in the in the peritoneum compared to intravenous administration of the NP's.

As will be understood by a person skilled in the art, the invention as disclosed herein is different in form compared to the drug delivery system as described in Snipstad et al. (*Ultrasound Med Biol* 2017, 43 (11), 2651-2669). As described herein, the drug delivery system of the invention is not administrated intravenously, and it does not comprise NP-stabilized MBs, as is described by Snipstad et al. (2017). In different embodiments, the drug delivery system according to the invention does not comprise NPs that stabilize the MBs nor NPs that are used to stabilize gas-filled MBs. Accordingly, the drug delivery system described herein is not dependent on ultrasound to achieve treatments effects, in contrast to the delivery system described in Snipstad et al. (Ultrasound Med Biol 2017, 43 (11), 2651-2669), which is ultrasound-mediated. Accordingly, in one embodiment as disclosed, the drug delivery system is not mediated by an acoustic field, such as ultrasound or focused ultrasound.

In a further embodiment, the drug delivery system does not comprise NPs that are associated with the MB. It is also disclosed a drug delivery system that does not comprise gas-filled MBs. In yet a further embodiment, the drug delivery system does not comprise MBs.

A preferred embodiment as provided herein is a drug delivery system comprising PEGylated PACA NPs loaded with a hydrophobic anti-cancer drug, or a pharmaceutically acceptable salt thereof, for treatment of cancer, by administration in the peritoneal cavity to a subject in need thereof.

In yet a preferred embodiment as provided herein is a drug delivery system comprising PEGylated PACA NPs loaded with CBZ, or a pharmaceutically acceptable salt thereof, for treatment of cancer, by administration in the peritoneal cavity to a subject in need thereof.

Compared with intravenous (IV) treatment, intraperitoneal (IP) administration permits a several-fold increase in drug concentration to be achieved within the abdominal cavity. Accordingly, the drug delivery system of the invention is for administration intraperitoneally.

In one embodiment, the drug delivery system of the invention is for treatment of cancer by intraperitoneal chemotherapy, such as hyperthermic intraperitoneal chemotherapy.

Degradation rate of PACA NPs can be controlled by the choice of the alkyl chain of the cyanoacrylate monomer, as demonstrated by Sulheim et al. (Sulheim et al. Cellular uptake and intracellular degradation of poly(alkyl cyanoacrylate) nanoparticles. J Nanobiotechnology. 2016 Jan. 8;14:1). It has also been demonstrated, using a panel of cell lines, that the cytotoxicity is dependent on the monomers used, i.e. n-butyl-, 2-ethyl-butyl-, or octyl cyanoacrylate (BCA, EBCA and OCA, respectively), see Sulheim et al (Sulheim et al. *Cytotoxicity of Poly(Alkyl Cyanoacrylate) Nanoparticles*. Int J Mol Sci. 2017 Nov. 18;18(11)).

In different embodiments of the invention, the alkyl chain of the cyanoacrylate monomer is a linear or branched C4-C10 alkyl chain. In preferred embodiments the monomer used is selected from the group consisting of n-butyl-(BCA), 2-ethyl butyl (EBCA), polyisohexyl (IHCA) and octyl cyanoacrylate (OCA). Accordingly, in different embodiments, the drug delivery system comprises NPs selected from the group consisting of PBCA (Poly(butyl cyanoacrylate)), PEBCA (poly (ethylbutylcyanoacrylate)), PIHCA (poly(isohexylcyanoacrylate)) and POCA (poly(octyl cyanoacrylate)).

As described herein, the NPs are PEGylated, i.e. coated with a hydrophilic polymer such as polyethylene glycol (PEG).

In different embodiments of the invention, the NPs are PEGylated with PEG-comprising molecules selected from the group consisting of Jeffamine® (polyetheramines), Brij® (polyoxyethylene stearyl ether), Kolliphor® (polyethoxylated castor oil), Pluronic® (ethylene oxide-propylene oxide block copolymers) or combinations thereof.

According to an embodiment, the NPs are PEGylated with the PEG-comprising molecules selected from Pluronic® and Kolliphor®.

According to another embodiment, the NPs are PEGylated with the PEG-comprising molecules selected from Brij® and Kolliphor®.

In an embodiment of the invention, the PACA NPs are produced according to a miniemulsion anionic polymerization process, in particular a one-step process as described in WO2014/191502, both with or without targeting moieties.

By using NPs that is further surface modified with targeting moieties, for example by using NPs prepared by miniemulsion anionic polymerization technique with polyalkylene glycols that is covalently attached to a targeting moiety, one can enable active targeting and potentially enhanced retention at specific locations, such as in tumors or diseased tissue. Also, this can facilitate uptake in cancer cells that is dependent upon specific ligand-receptor interactions.

The targeting moiety may be any suitable moiety that causes the NPs to bind specifically at targeted locations.

Preferably, the targeting moiety has a molecular weight in the range of 100 to 200000 Da, more preferably 200 to 50000 Da, even more preferably 300 to 15000 Da.

It should be appreciated that a single targeting moiety or a mixture of different targeting moieties may be used.

Example targeting moieties are selected from the group consisting of an amino acid, protein, peptide, antibody, antibody fragment, saccharide, carbohydrate, glycan, cytokine, chemokine, nucleotide, lectin, lipid, receptor, steroid, neurotransmitter, cell surface marker, cancer antigen, glycoprotein antigen, aptamer or mixtures thereof. Particularly preferred targeting moieties include linear and cyclic peptides. In one embodiment, the targeting moiety does not belong to the group consisting of amino acids and lipids. It is previously known that the size of nanoparticles influences the targeting effects of the nanoparticles when they are administrated systemically into the blood, as they accumulate in the areas around tumors with leaky vasculature. This is known as 'enhanced permeability and retention' (EPR) effect in tumor tissue. The EPR effect is as a type of targeting, commonly referred to as "passive targeting".

The NPs as described herein are typically of a size from about 1-800 nm, such as about 30-500, preferably about 80-200 nm. Accordingly, the EPR effect will allow the NPs as described herein to selectively extravasate and accumulate in tumors.

Traditionally, tumor targeting approaches are classified into 'passive targeting' and 'active targeting'. The EPR effect will be known to the skilled person as a form of passive targeting. The introduction of targeting moieties on the surface of the NP will be known to the skilled person as a type of active targeting.

The NPs used in the examples contain the cytotoxic drug cabazitaxel (CBZ). CBZ is a semi-synthetic taxane derivative that inhibits microtubule disassembly. CBZ is a hydrophobic molecule and has a very low water solubility, which complicates the administration of the free, non-encapsulated drug.

However, as demonstrated in the examples, due to excellent compatibility and solubility of CBZ or an alternative hydrophobic anti-cancer drug in alkyl cyanoacrylate monomers, high concentrations of the drug can be dissolved in alkyl cyanoacrylate monomer solution and thus become encapsulated in PACAs prepared by a miniemulsion anionic polymerization process.

According to a different aspect, the loading capacity of a hydrophobic anti-cancer drug in NPs can be 1-90 wt % of the total weight of the NP, preferentially 1-20 wt % or 5-50 wt % of the total weight of the NP. In particularly preferred embodiments, the loading capacity of hydrophobic anti-cancer drug is from 1-20 wt % or 5-50 wt % of the total weight of the NP. In particularly preferred embodiments, the loading capacity of CBZ is from 5-15 wt % of the total weight of the NP, such as 5, 6, 7, 8, 9, 10, 11, 12, 13, 14, 15 wt % of the total weight of the NP.

According to yet a different aspect, the loading capacity of CBZ in NPs can be 1-90 wt % of the total weight of the NP, preferentially 1-20 wt % or 5-50 wt % of the total weight of the NP. In particularly preferred embodiments, the loading capacity of CBZ is from 5-15 wt % of the total weight of the NP, such as 5, 6, 7, 8, 9, 10, 11, 12, 13, 14, 15 wt % of the total weight of the NP.

Accordingly, the drug delivery system described herein has a high loading capacity for hydrophobic drugs, which is shown to influence the treatment effects of the composition.

As CBZ is insoluble in water, the conventional formulation is CBZ solubilized in a polysorbate 80 solution. As used herein, non-encapsulated or free CBZ refers to the conventional formulation.

CBZ has been included in several clinical trials that study the effects on different types of cancer including several types of prostate cancer, adrenocortical carcinoma, testicular cancer, urothelium transitional cell carcinoma and ovarian cancer.

In the clinical studies, it has been demonstrated that the efficacy of CBZ is accompanied by serious side effects and deaths due to toxicity. The toxicity rates observed in clinical trials have been assumed to pose an obstacle to use and management of CBZ, a drug that, on the other hand, has demonstrated great activity. In the transition from clinical trial to clinical practice, it has been speculated that CBZ will not be used much because of the risk of side effects, as well as high cost and discomfort derived from the administration regimes and the lack of patient compliance with the administration regimes previously proposed for CBZ-treatments. Thus, limiting the administration regimes, for example from tree-weekly to weekly has been proposed in treatment of for example prostate cancer, to improve hematologic tolerance along with a better therapeutic range to be able to increase the dose intensity and activity without increasing the associated toxicity.

Accordingly, the advantage that drug-loaded NPs give less adverse effects than free drug makes the drug delivery system as described by the inventors highly relevant for CBZ or an alternative hydrophobic anti-cancer drug such as an alternative taxane. Encapsulating a taxane such as CBZ or an alternative hydrophobic anti-cancer drug in NPs offers a more sustained release profile of the drug, which can ameliorate parts of the toxicity and allows for administration of higher doses. The reduction of adverse effects allows for administration of increased doses of drugs. Accordingly, encapsulation of drug in the NPs will further improve the treatment effects. Accordingly, the inventors propose the idea that the drug delivery system as described herein will enhance treatments effects and/or reduce side effects when used in treatment of cancer.

In different embodiments, the invention provides a drug delivery system comprising optionally PEGylated PACA NPs loaded with a hydrophobic anti-cancer drug such as for example CBZ, or a pharmaceutically acceptable salt thereof, for treatment of cancer, wherein the cancer is selected from the group consisting of prostate cancer, breast cancer, peritoneal cancer, colorectal carcinoma, gastric cancer, rectal carcinoma glioma, lung cancer, renal cancer, liver cancer, spleen cancer, gallbladder carcinoma, lymphoma, adrenocortical carcinoma, testicular cancer, urothelium transitional cell carcinoma, and ovarian cancer.

In different embodiments, the peritoneal carcinomatosis can originate from ovarian cancer, colorectal carcinoma, gastric cancer, renal cancer, rectal carcinoma, pseudomyxoma peritonei, pancreatic carcinoma, hepatocellular carcinoma, gallbladder carcinoma, appendiceal malignancies, endometrial carcinoma, cervical cancers, breast cancer, lung cancer, malignant melanoma, adrenocortical carcinoma or transitional cell carcinoma of the urinary tract. In two particular embodiments, the cancer is a peritoneal carcinomatosis originating from colorectal cancer or pseudomyxoma peritonei.

According to an embodiment, the drug delivery system is provided in a composition to be administrated intracavitary. The composition can optionally comprise pharmaceutically acceptable carriers and excipients.

According to a second embodiment, the drug delivery system is provided in a composition to be administered intraperitoneally. The compositions can optionally comprise pharmaceutically acceptable carriers and excipients.

An aspect of the first or the second embodiment the invention includes a method of treating cancer comprising administering a drug delivery system according to the first to a subject in need thereof. Exemplary subjects include mammalian subjects such as human subjects.

The invention is illustrated by the following non-limiting examples.

EXAMPLES

Example 1

Synthesis and characterization of nanoparticles. PEGylated PEBCA NPs were synthesized by miniemulsion polymerization. An oil phase consisting of 2.5 g 2-ethylbutyl cyanoacrylate (monomer, Cuantum Medical Cosmetics, Spain) containing 0.2% (w/w) butylated hydroxytoluene (Fluka, Switzerland) and 2% (w/w) Miglyol® 812 (Cremer, USA) was prepared. Particles containing cytostatic drug for treatment were prepared by adding CBZ (10% (w/w), Biochempartner Co. Ltd., China, product item number BCP02404) to the oil phase.

Figure 8:
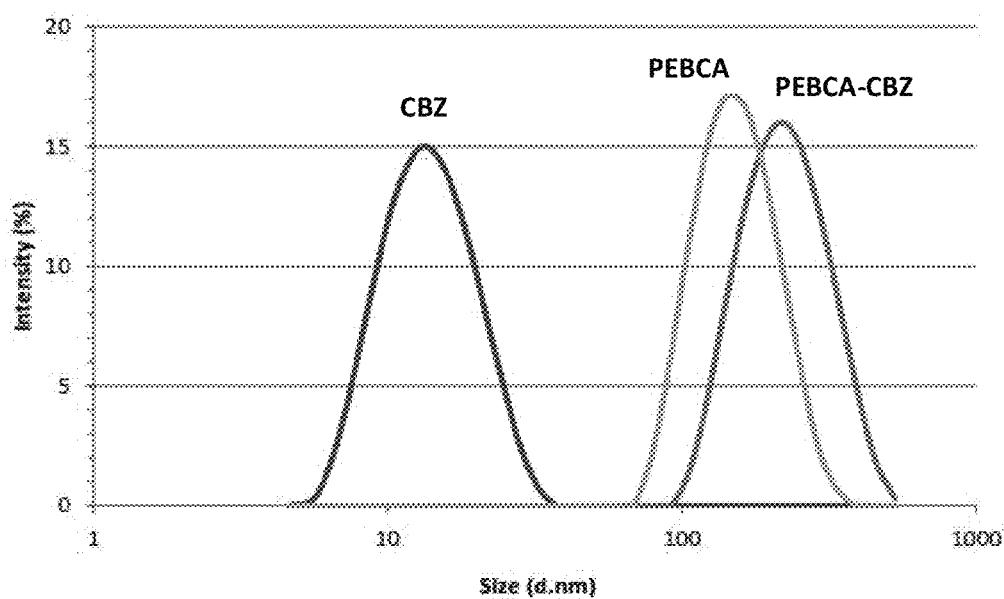
FIG. 8: Nanoparticle size distribution of the batches used in the in-vivo mouse model study of example 2. The particle size distributions for PEBCA-CBZ (the batch with size z-average of 215 nm in Table 1) and for PEBCA (without drug; the batch with z-average of 156 nm in Table 1). The size distribution of non-encapsulated CBZ, solubilized in a polysorbate 80 solution. Intensity (%) on the y-axis means percent intensity of total scattering.

An aqueous phase consisting of 0.1 M HCl (20 ml) containing Brij®L23 (6 mM, Sigma, USA) and Kolliphor® HS15 (6 mM, Sigma, Germany) was added to the oil phase and immediately sonicated for 3 min on ice (6×30 sec intervals, 60% amplitude, Branson Ultrasonics digital sonifier 450, USA). The solution was rotated (15 rpm, SB3 rotator, Stuart, UK) at room temperature overnight before adjusting the pH to 5 using 1 M NaOH. The polymerization was continued for 5 h at room temperature on rotation. The dispersion was dialyzed (Spectra/Por® dialysis membrane MWCO 100,000 Da, Spectrum Labs, USA) against 1 mM HCl to remove unreacted PEG. The size, polydispersity index (PDI) and the zeta potential of the NPs were measured by dynamic light scattering and laser Doppler Micro-electrophoresis using a Zetasizer Nano ZS (Malvern Instruments, UK). To calculate the amount of encapsulated drug, the drug was extracted from the particles by dissolving them in acetone (1:10), and quantified by liquid chromatography coupled to mass spectrometry (LC-MS/MS) as described below, see FIG. 8 and table 1.

CBZ quantification by LC-MS/MS. CBZ, as the pure chemical or part of NPs, was quantified by LC-MS/MS, using an Agilent 1290 HPLC system coupled to an Agilent 6490 triple quadrupole mass spectrometer. The HPLC column was an Ascentis® Express C8, 75×2.1 mm, 2.7 µm particles size with a 5×2.1 mm guard column of the same material (Sigma), run at 40° C. Eluent A was 25 mM formic acid in water and eluent B was 100% methanol, and flow rate was 0.5 ml/min. The mobile phase gradient was isocratic at 55% B for 1.5 min, then from 55% to 80% B over 1 min, followed by 1 min washout time and subsequently column re-equilibration. Injection volume was 5.00 µl. MS detection was in positive ESI mode (Agilent Jetstream) quantified in multiple reaction monitoring (MRM) mode using the transition m/z 858.3→577.2. The parent ion was chosen to be the Na adduct as this gave the best sensitivity. Similarly, the hexadeuterated internal standard was detected on the 864.4→583.2 transition. Both analytes were run at 380 V fragmentor and 20 V collision energy.

Reference standards were used for accurate quantification. The unlabeled CBZ standard was the same as used for synthesis (see above) at >98% purity. Hexadeuterated CBZ internal standard was purchased from Toronto Research Chemicals (Toronto, Canada; catalogue number C046502 at 99.6% isotopic purity). Standards were dissolved in acetone and were used to build an unlabeled standard series spanning at least five concentration points.

The limit of quantification (LOQ) was calculated from six replicate quantifications of the lowest concentration point in the standard curves (0.1 ng/ml), specifically as the average plus six standard deviations; this amounted to an LOQ of 0.19 ng/ml (signal/noise ratio >20). Accuracy based on the same standard sample set was 8.8% and precision was 18.0%.

Example 2

Biodistribution and In vivo imaging. PEBCA NPs labeled with the lipophilic and fluorescent dye NR668 were used to study the biodistribution in healthy mice using an IVIS® Spectrum in vivo imaging system (Perkin Elmer). Mice were intraperitoneally or intravenously injected the same dose PEBCA without drug. The excitation/emission wavelength pair of 535/640 nm was found to give the best signal-to-noise ratio and was thus used for imaging of the NPs. Whole body images were obtained 1 h, 24 h, 72 h, 7 days and 14 days after injection; the animals were then sacrificed by cervical dislocation and organs were harvested. The organs were imaged ex vivo with the IVIS scanner using the same settings as above. Relative signal intensity in the organs was calculated, using Living Image® software (Perkin Elmer), as radiant efficiency (Emission light [photons/sec/$cm^2$/str]/Excitation light [$\mu W/cm^2$]×109) per pixel of the region of interest, which was drawn around the respective organ.

Example 3

In Vivo Treatments Effects in Two Animal Models

The models were generated by implanting tumor tissue pieces from patients with peritoneal metastases from colorectal cancer or pseudomyxoma peritonei in nude mice (Flatmark, K., et al., *Pseudomyxoma peritonei—two novel orthotopic mouse models portray the PMCA-I histopathologic subtype*. BMC Cancer, 2007. 7: p. 116; Flatmark, K., et al., *Exploring the peritoneal surface malignancy phenotype—a pilot immunohistochemical study of human pseudomyxoma peritonei and derived animal models*. Human Pathology, 2010. 41(8): p. 1109-1119; Flatmark, K., et al., *Immunotoxin targeting EpCAM effectively inhibits peritoneal tumor growth in experimental models of mucinous peritoneal surface malignancies*. Int J Cancer, 2013. 133(6): p. 1497-506). Passage to new generations of mice is performed by injection of mucinous tumor tissue into the peritoneal cavity. For initiation of experiments, 200 µl mucinous tumor from donor mice was injected intraperitoneally. Treatment was initiated the following day to simulate the clinical situation after cytoreductive surgery where all visible tumor has been removed.

Cabazitaxel (CBZ) in Polysorbate 80 was diluted in 13% ethanol, and further diluted in 0.9% NaCl to a concentration of 0.60 or 0.75 mg/ml. PACA(CBZ) was synthesized as described in Example 1, and further dissolved in 0.9% NaCl. A dose of 15 mg/kg was injected intraperitoneally in a volume of 20 or 25 µl/g (mouse body weight) to groups of 5-6 mice. The control group received injections of vehicle consisting of 13% ethanol in 0.9% NaCl to mimic the CBZ solvent. The animals were sacrificed when abdominal distention caused by tumor growth was clearly visible as assessed by an experienced animal technician. To compare tumor growth in different treatment groups a growth index was calculated by combining the two key parameters survival (time in days) and tumor growth (weight in g) using the equation:

$$\text{Growth index } (GI) = \text{tumor weight} + ((T_{total} - T_A)/T_{Total}) \times 10$$

$T_A$ is the survival time for each animal, and $T_{Total}$ is the total duration of the experiment (in this case 100 days).

RESULTS

Two experiments were performed in models PMCA1 (derived from patient with colorectal cancer) and PMCA3 (derived from patient with pseudomyxoma peritonei) and demonstrated an increased treatments effects of PACA (CBZ) compared to negative control (Vehicle, consisting of 13% ethanol in 0.9% NaCl) and CBZ (in Polysorbate 80, diluted in 13% ethanol, and further diluted in 0.9% NaCl to a concentration of 0.60 or 0.75 mg/ml).

FIG. 1 displays the tumor growth index in response to treatment with 15 mg/kg CBZ and PACA (CBZ) in PMCA-1.

All vehicle-treated animals were sacrificed because of tumor growth. CBZ significantly inhibited tumor growth compared to vehicle treatments and 3/6 mice were cured by the treatment (i.e. sacrificed on day 100 with no detectable tumor). PACA (CBZ) cured 5/6 mice and significantly inhibited tumor growth compared to vehicle treatment. Even though the difference between the CBZ and PACA (CBZ) groups was not statistically significant, it was a clear tendency toward an increased treatment effect in the group where mice where given PACA (CBZ). Since this model was very sensitive to CBZ, lower doses of CBZ could be tested to further explore a potential advantage of incapsulating the drug.

Figure 3:
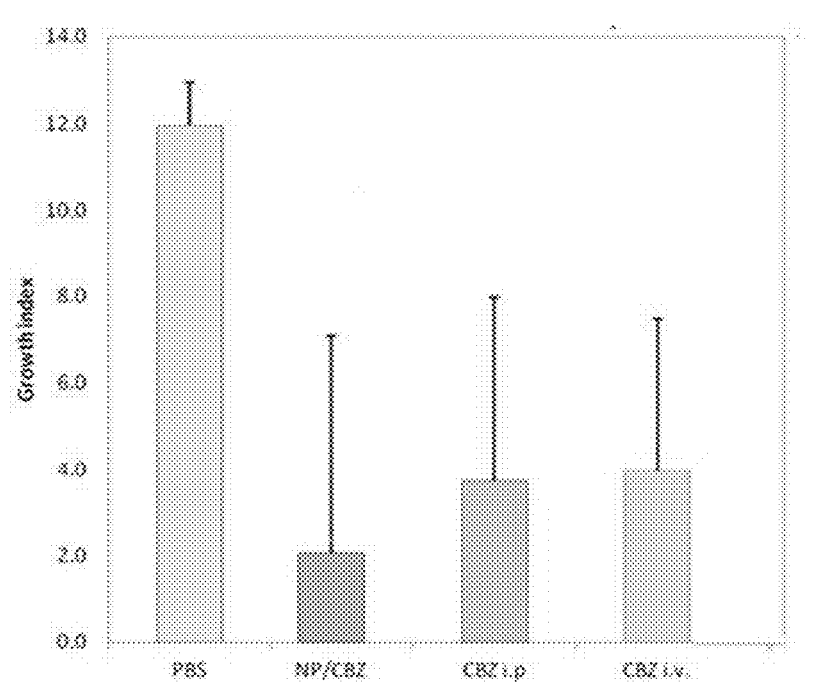
FIG. 3: Displaying tumor growth index in response to treatment with 15 mg/kg CBZ and PACA(CBZ) in PMCA-1. A comparison of tumor growth after intraperitoneally (IP.) injection and intravenous (IV) injection. PBS (Phosphate Buffer Saline)

FIG. 3 displays the tumor growth index in response to treatment with 15 mg/kg CBZ and PACA (CBZ) in PMCA-1 where IP and IV injections is compared. Even though the difference between the CBZ and PACA (CBZ) groups was not statistically significant, it was a clear tendency toward an increased treatment effect in the group where mice where given PACA (CBZ) by intraperitoneal injection. This result also correlates with the survival studies displayed in FIG. 4.

Without being bound by theory, it is hypothesized that the PACA particles interact with the tumors in some ways, enabling an increased uptake of the encapsulated drug. This could explain the tendency towards the increased effects.

Figure 2:
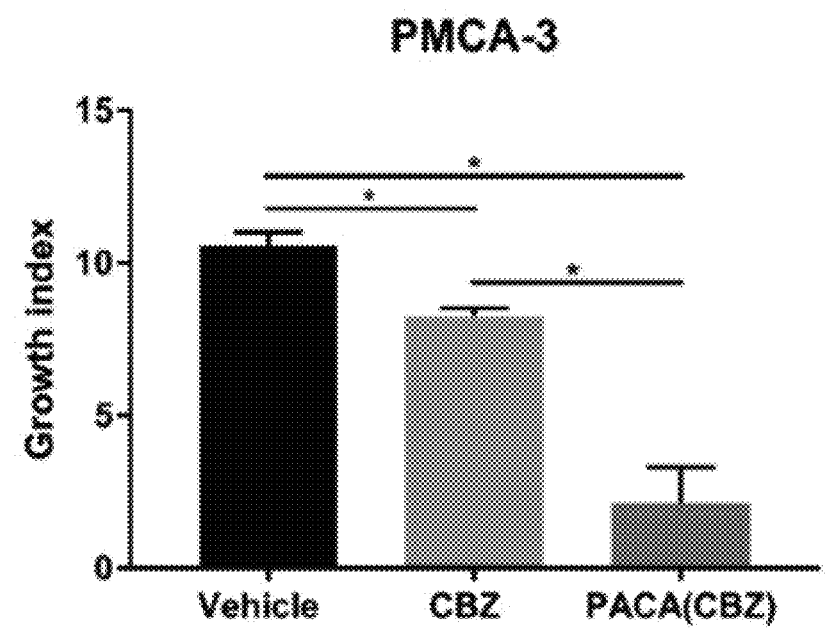
FIG. 2: Displaying tumor growth index in response to treatment with 15 mg/kg CBZ and PACA(CBZ) in PMCA-3. The nanoparticles were injected intraperitoneally.* indicates p<0.05. All vehicle-treated animals were sacrificed because of tumor growth. No animals were cured in the CBZ group. In the group treated with PACA(CBZ): 2 out of 5 mice were cured. PBS (Phosphate Buffer Saline)

The results in the PMCA3 model is shown in FIG. 2 and demonstrate the growth index in response to treatment with 15 mg/kg CBZ and PACA (CBZ) in PMCA-3.

All vehicle-treated animals were sacrificed because of tumor growth. CBZ alone significantly reduced tumor growth in this model compared to vehicle treatment, but no animals were cured. PACA (CBZ) treatment significantly inhibited tumor growth compared to vehicle treatment and CBZ alone, and 2/5 mice were cured.

Figure 4:
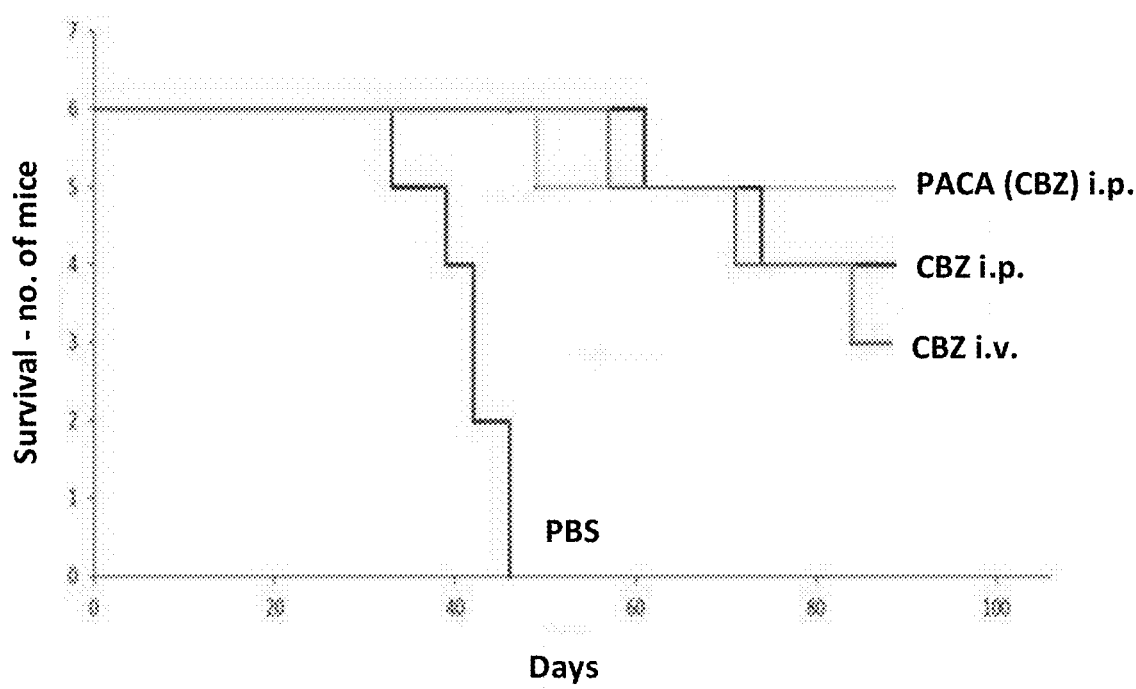
FIG. 4: Kaplan-Meier survival curves displaying number of mice that survived after treatment with 15 mg/kg CBZ and PACA(CBZ) in PMCA-1. CBZ IP.: 4 out of 6 mice were still alive at day 90 after the injection. CBZ IV: 3 out of 6 mice were still alive at day 90 after the injection. PACA (CBZ) IP.: 5 out of 6 mice were still alive at day 90 after the injection. PBS (Phosphate Buffer Saline).
Figure 5:
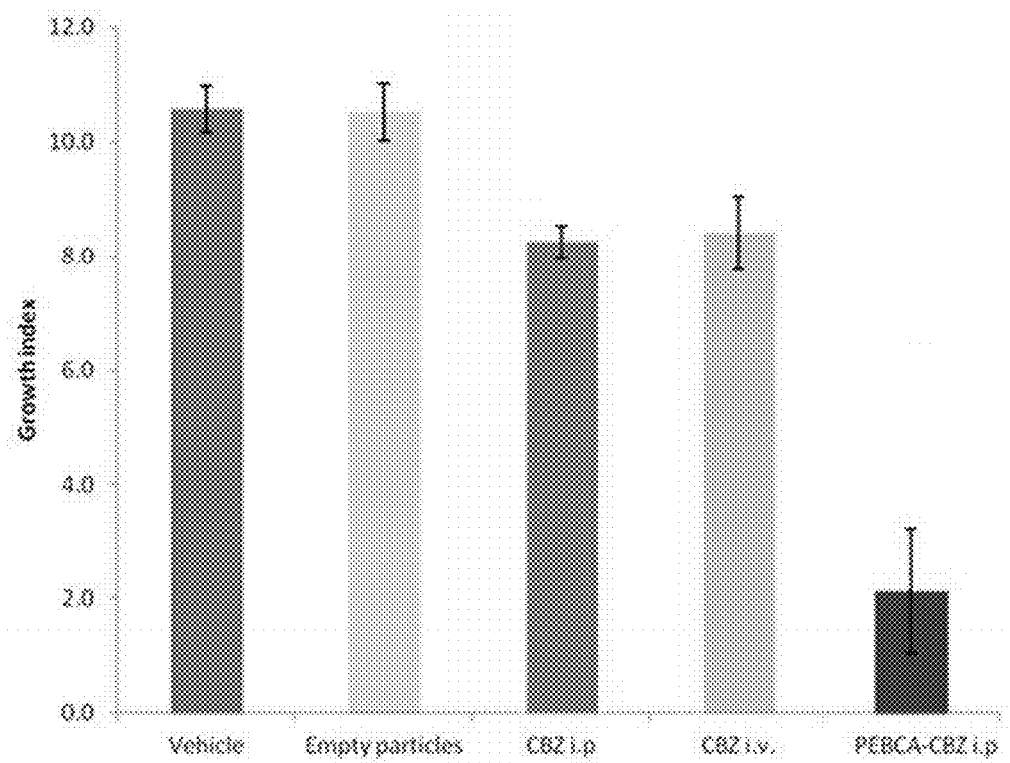
FIG. 5: Displaying tumor growth index in response to treatment with 15 mg/kg CBZ and PACA(CBZ) in PMCA-3. A comparison of tumor growth after intraperitoneally (IP.) injection and intravenous (IV) injection. PBS (Phosphate Buffer Saline).
Figure 6:
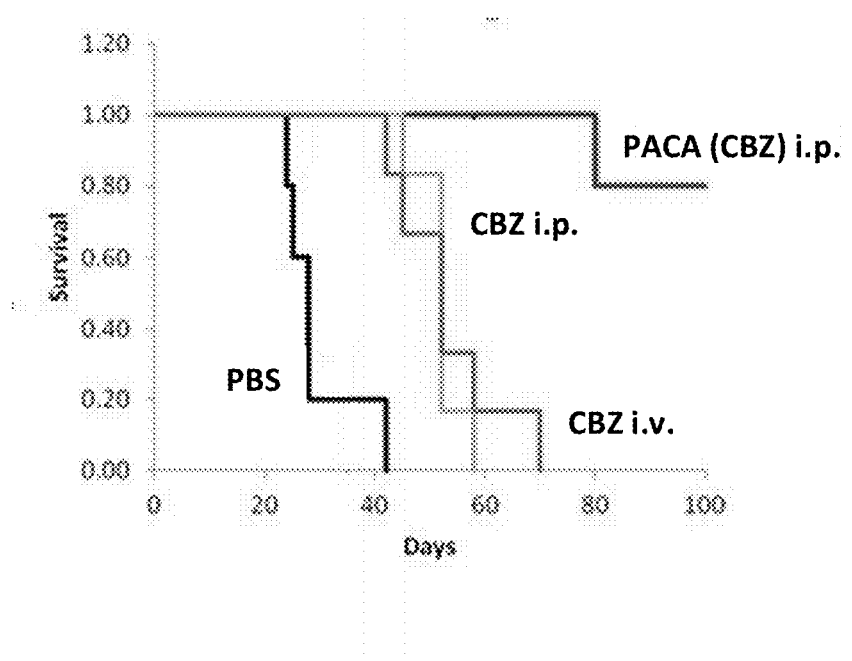
FIG. 6: Kaplan-Meier survival curves displaying the survival rate after treatment with 15 mg/kg CBZ and PACA (CBZ) in PMCA-3. CBZ IP.: none of the mice were still at day 60 after the injection. CBZ IV: none of the mice were alive at day 70 after the injection. PACA(CBZ) IP.: 80% of the mice were still alive at day 100 after the injection. PBS (Phosphate Buffer Saline).

FIG. 4 displays the tumor growth index in response to treatment with 15 mg/kg CBZ and PACA (CBZ) in PMCA-3 where IP and IV injections is compared. In the PMCA-3 the difference between the CBZ and PACA (CBZ) groups was statistically significant. It was a clear increased treatment effect in the group where mice where given PACA (CBZ) by intraperitoneal injection. This result also correlates with the survival rate displayed in FIG. 6.

Clearly both studies showed significant tumor growth reduction and improved survival for IP administered PACA (CBZ) compared to free drug given IV and IP.

FIG. 7A-E display biodistribution of the PACA particles according to the invention. Administration of PACA NPs IP results in very high local concentrations of model drug in the peritoneum.

Figure 7A:
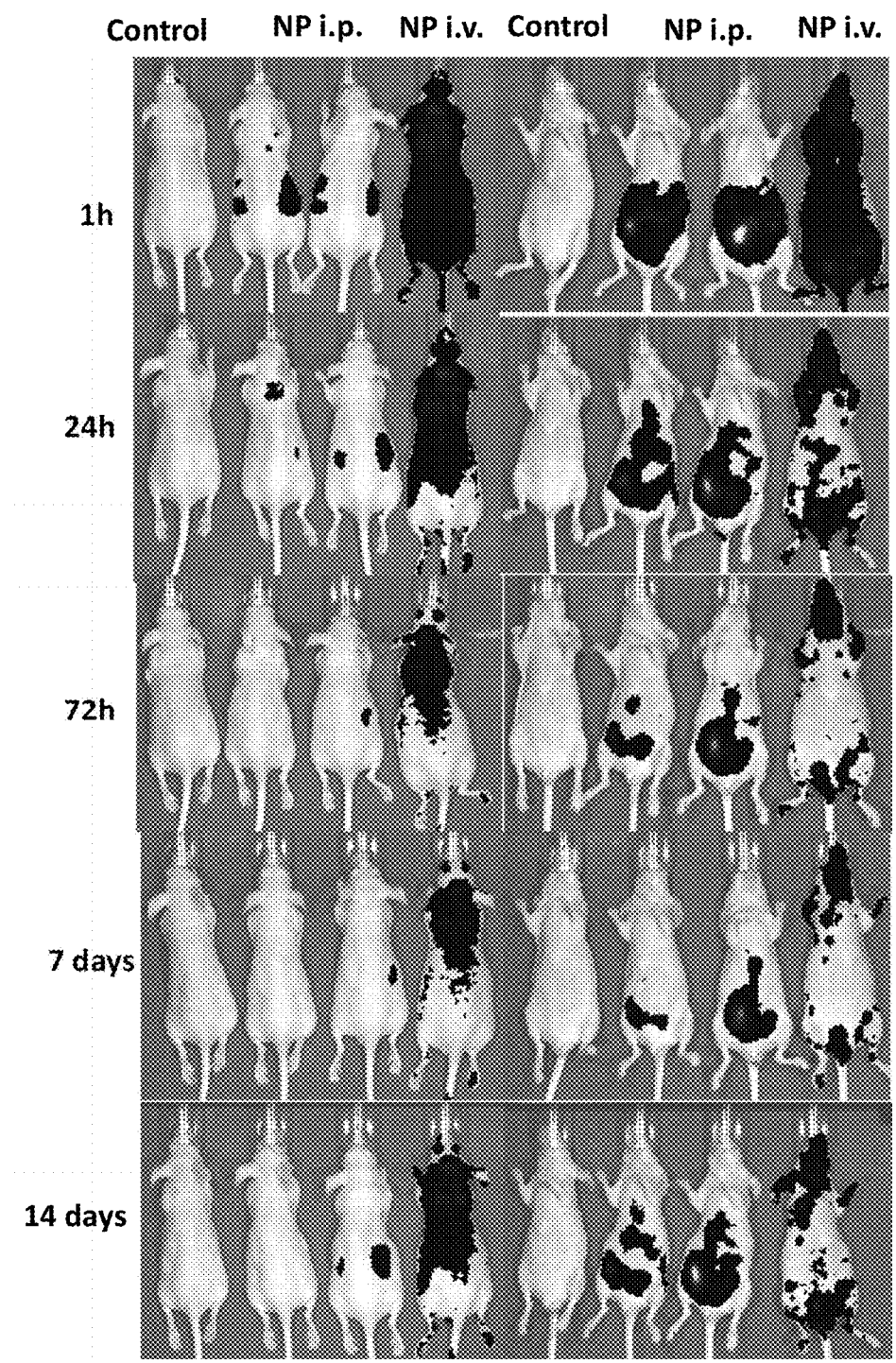
FIGS. 7A-E show whole body imaging. Biodistribution of PEBCA particles containing the fluorescent dye NR668 measured in healthy nude mice. Representative images of mice and organs from individual groups are shown.
Figure 7B:
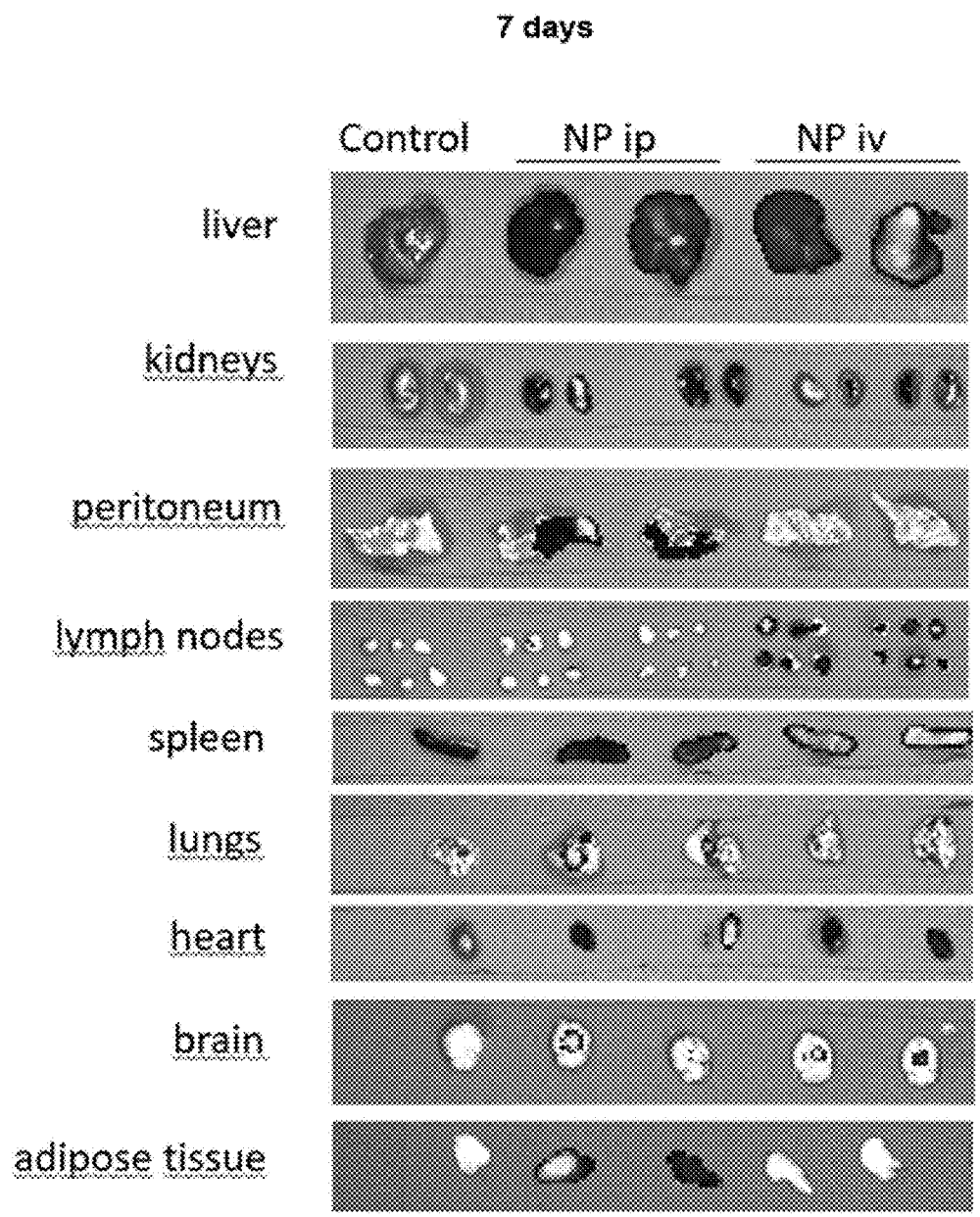
Figure 7C:
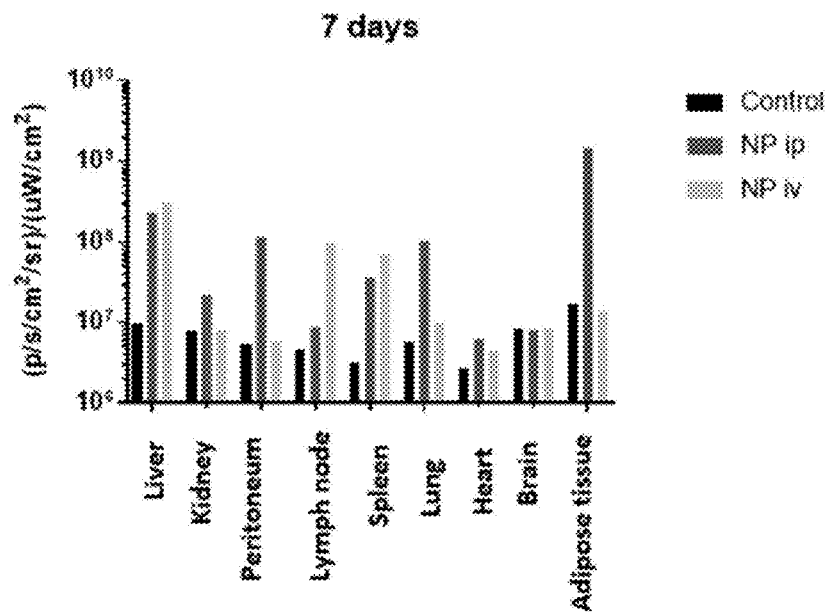
Figure 7D:
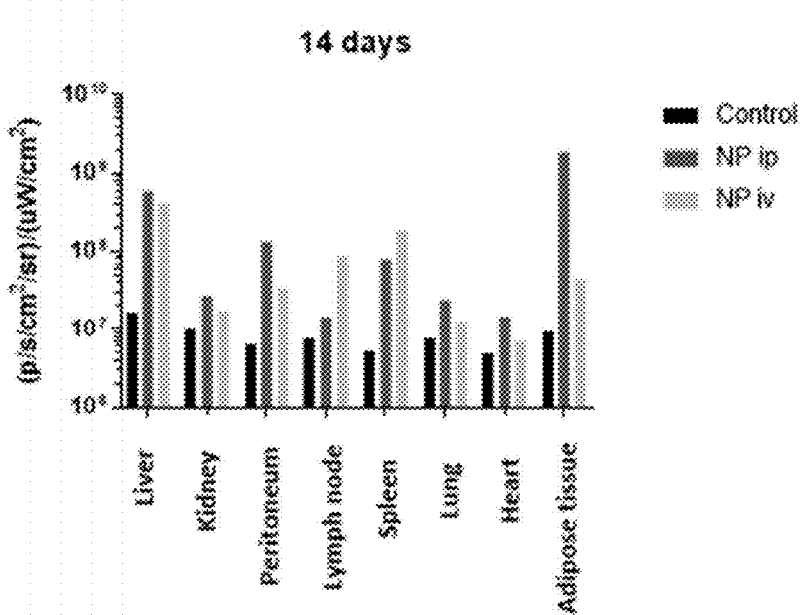
Figure 7E:
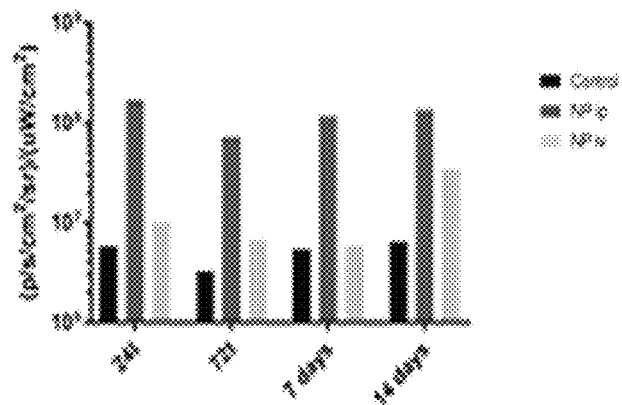

Even two weeks after a single administration there is still significant signal from the model drug in the peritoneum, cf. FIG. 7C-E.

The results can explain the good treatment effect of peritoneal carcinomatosis obtained with PACA NPs, i.e. the PACA (CBZ) is retained within the peritoneum for a long period of time.

The biodistributions study also clearly demonstrate that intraperitoneal injection is less systemic compared to intravenous injection, cf. FIG. 7A).

TABLE 1

Description of size, PDI, zeta potential, NP and drug content of the batches used in this study.

| Study | NP description | Size z-avg. (nm) | Size number-avg. (nm) | PDI | Zeta-potential (mV) | CBZ content in NPs (% w/w) | CBZ content in stock sol. (mg/ml) | NP content in stock sol. (mg/ml) |
|---|---|---|---|---|---|---|---|---|
| MAS.98.12 | PEBCA-NR668 | 156 | 86 | 0.19 | −2.2 | — | — | 39 |
| MAS.98.12 | PEBCA-NR668-CBZ | 215 | 161 | 0.17 | −2.4 | 8.6 | 2.1 | 24 |
| MDA-MB-231 and biodistribution | PEBCA | 148 | 118 | 0.09 | −0.6 | — | — | 74 |
| MDA-MB-231 and biodistribution | PEBCA-CBZ | 214 | 196 | 0.07 | −1.1 | 7.0 | 3.4 | 49 |
| IVIS imaging | PEBCA-NR668 | 172 | 152 | 0.04 | −0.8 | — | — | 57 |

TABLE 1-continued

Description of size, PDI, zeta potential, NP and drug content of the batches used in this study.

| Study | NP description | Size z-avg. (nm) | Size number-avg. (nm) | PDI | Zeta-potential (mV) | CBZ content in NPs (% w/w) | CBZ content in stock sol. (mg/ml) | NP content in stock sol. (mg/ml) |
|---|---|---|---|---|---|---|---|---|
| IVIS imaging | PEBCA-NR668-CBZ | 227 | 186 | 0.15 | −1.1 | 6.0 | 3.4 | 56 |

Embodiment 1: A method for treatment of cancer in a subject, the method comprising intraperitoneally administering to the subject a poly(alkyl cyanoacrylate) nanoparticle, the nanoparticle comprising cabazitaxel, wherein the nanoparticle is administered to the subject in an amount sufficient to treat the cancer in the subject.

Embodiment 2. The method of embodiment 1, wherein the nanoparticle is administered in an amount sufficient to inhibit the metastasis of the cancer in the subject and the method comprises inhibiting metastasis in the subject.

Embodiment 3. The method of embodiment 1, wherein the nanoparticle is produced according to a miniemulsion anionic polymerization process.

Embodiment 4. The method of embodiment 3, wherein the nanoparticle has dimensions below 800 nm.

Embodiment 5: The method of embodiment 3, wherein the cabazitaxel is encapsulated by the nanoparticle.

Embodiment 6: The method of embodiment 3, wherein the nanoparticle is PEGylated.

Embodiment 7: The method of embodiment 1, wherein the alkyl chain of the cyanoacrylate is selected from the group consisting of n-butyl-(BCA), 2-ethyl butyl (EBCA), polyisohexyl (IHCA) and octyl cyanoacrylate (OCA).

Embodiment 8: The method of embodiment 5, wherein the cabazitaxel comprises 1-90 wt % of the total weight of the nanoparticle.

Embodiment 9: The method of embodiment 1, wherein the administering is performed using intraperitoneal injection.

Embodiment 10: The method of embodiment 1, wherein intraperitoneally administering is subsequent to cytoreductive surgery.

Embodiment 11: The method of embodiment 1, wherein the cancer is selected from the group consisting of prostate cancer, breast cancer, peritoneal cancer, peritoneal carcinomatosis, glioma, lung cancer, adrenocortical carcinoma, testicular cancer, urothelium transitional cell carcinoma, and ovarian cancer.

Embodiment 12: The method of embodiment 1, wherein the cancer is peritoneal carcinomatosis originating from ovarian cancer, colorectal carcinoma, pseudomyxoma peritonei, pancreatic cancer, stomach cancer, hepatocellular carcinoma, gallbladder carcinoma, renal cell carcinoma, transitional cell carcinoma, endometrial, cervical cancers, breast cancer, lung cancer, or malignant melanoma.

The use of the terms "a" and "an" and "the" and similar referents (especially in the context of the following claims) are to be construed to cover both the singular and the plural, unless otherwise indicated herein or clearly contradicted by context. The terms first, second etc. as used herein are not meant to denote any particular ordering, but simply for convenience to denote a plurality of, for example, layers. The terms "comprising", "having", "including", and "containing" are to be construed as open-ended terms (i.e., meaning "including, but not limited to") unless otherwise noted. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Any combination of the above-described elements in all possible variations thereof is encompassed by the invention unless otherwise indicated herein or otherwise clearly contradicted by context.

The invention claimed is:

1. A method for treatment of cancer in a subject, the method comprising intraperitoneally administering to the subject a poly(alkyl cyanoacrylate) nanoparticle, the nanoparticle encapsulating a hydrophobic anti-cancer drug, and wherein the nanoparticle is administered to the subject to treat the cancer in the subject, wherein the poly(alkyl cyanoacrylate) comprises a cyanoacrylate having a 2-ethyl butyl (EBCA) alkyl chain, wherein the nanoparticle does not include a targeting moiety, and wherein the cancer is a primary peritoneal cancer or peritoneal carcinomatosis.

2. The method of claim 1, wherein the method comprises inhibiting metastasis in the subject.

3. The method of claim 1, wherein the nanoparticle is produced according to a miniemulsion anionic polymerization process.

4. The method of claim 3, wherein the nanoparticle has dimensions below 800 nm.

5. The method of claim 3, wherein the nanoparticle has dimensions from 30 nm to 500 nm.

6. The method of claim 3, wherein the nanoparticle is PEGylated.

7. The method of claim 1, wherein the hydrophobic anti-cancer drug comprises 1-90 wt % of the total weight of the nanoparticle.

8. The method of claim 1, wherein the hydrophobic anti-cancer drug is a taxane.

9. The method of claim 8, wherein the taxane is cabazitaxel.

10. The method of claim 1, wherein the cancer is pseudomyxoma peritonei or peritoneal carcinomatosis originating from ovarian cancer, colorectal carcinoma, gastric cancer, renal cancer, rectal carcinoma, pancreatic carcinoma, hepatocellular carcinoma, gallbladder carcinoma, appendiceal malignancies, endometrial carcinoma, cervical cancers, breast cancer, lung cancer, malignant melanoma, adrenocortical carcinoma, or transitional cell carcinoma of the urinary tract.

11. The method of claim 10, wherein the subject is a human subject.

* * * * *